(12) United States Patent
Shau (10) Patent No.: US 10,055,192 B1
(45) Date of Patent: Aug. 21, 2018

(54) MOBILE PHONES WITH WARNINGS OF APPROACHING VEHICLES

(71) Applicant: David Shau, Palo Alto, CA (US)

(72) Inventor: David Shau, Palo Alto, CA (US)

(*) Notice: Subject to any disclaimer, the term of this patent is extended or adjusted under 35 U.S.C. 154(b) by 0 days.

(21) Appl. No.: 15/972,157

(22) Filed: May 6, 2018

Related U.S. Application Data (63) Continuation-in-part of application No. 15/476,806, filed on Mar. 31, 2017.

(51) Int. Cl.
| | |
|---|---|
| *G06F 3/16* | (2006.01) |
| *H04W 92/10* | (2009.01) |
| *H04W 88/10* | (2009.01) |
| *G06F 17/30* | (2006.01) |
| *H04R 1/22* | (2006.01) |
| *H04W 88/06* | (2009.01) |

(52) U.S. Cl.
CPC .......... *G06F 3/167* (2013.01); *G06F 17/3074* (2013.01); *H04R 1/222* (2013.01); *H04W 88/06* (2013.01); *H04W 88/10* (2013.01); *H04W 92/10* (2013.01)

(58) Field of Classification Search
CPC ......... B60Q 9/008; G01S 11/14; G01S 3/808; G01S 3/8083; G01S 5/22; G02B 27/01; G06K 9/00362; G06K 9/00697; G08G 1/005; G08G 1/0965; G08G 1/096725; G08G 1/166; G08B 23/00; H04M 1/72577; G05D 1/0214; G05D 1/0255; G10K 11/178; G10K 2210/1081; G10K 2210/3027; H04R 1/1083; H04R 1/222; G06F 3/167; G06F 17/3074; H04W 88/06; H04W 88/10; H04W 92/10
See application file for complete search history.

(56) References Cited

U.S. PATENT DOCUMENTS

| | | | | |
|---|---|---|---|---|
| 9,103,903 | B2* | 8/2015 | Funayanna | G01S 3/8083 |
| 9,286,794 | B2* | 3/2016 | Duncan | G08G 1/005 |
| 9,761,118 | B2* | 9/2017 | Lee | G08B 23/00 |
| 9,852,736 | B2* | 12/2017 | Sharma | G10L 19/018 |
| 2009/0192688 | A1* | 7/2009 | Padmanabhan | G08G 1/0104 701/70 |
| 2010/0214086 | A1* | 8/2010 | Yoshizawa | G01S 3/801 340/435 |
| 2012/0032806 | A1* | 2/2012 | Lee | H04M 1/72577 340/573.1 |
| 2012/0281856 | A1* | 11/2012 | Georgiou | G10K 11/178 381/94.2 |
| 2012/0323532 | A1* | 12/2012 | Yoshioka | B60R 16/00 702/189 |

(Continued)

FOREIGN PATENT DOCUMENTS

WO  WO-2012140498 A1 * 10/2012 ........... G01S 3/8083

*Primary Examiner* — Matthew C Sams (57) ABSTRACT

A mobile phone is constructed with methods that use either one or a plurality of microphones to provide warnings for the user of dangerous incoming vehicles. These warnings are displayed on the screen of the mobile phone, and such warnings indicate the direction of a vehicle, the level of danger that each vehicle poses to the individual, and the type of vehicle that is approaching. These methods are all determined by the Short Time Interval Fourier Transform (STIFT) method, wherein said STIFT method consumes minimal computing power relative to mobile phones.

18 Claims, 5 Drawing Sheets

(56) References Cited

U.S. PATENT DOCUMENTS

| | | | |
|---|---|---|---|
| 2014/0136096 A1* | 5/2014 | Funayanna | G01S 3/8083 |
| | | | 701/300 |
| 2015/0109149 A1* | 4/2015 | Duncan | G08G 1/005 |
| | | | 340/944 |
| 2016/0140840 A1* | 5/2016 | Duncan | G08G 1/005 |
| | | | 340/944 |
| 2017/0213459 A1* | 7/2017 | Ogaz | G08G 1/096725 |

* cited by examiner

MOBILE PHONES WITH WARNINGS OF APPROACHING VEHICLES

This application is a continuation-in-part application of previous patent application with a Ser. No. 15/476,806, with a title "Mobile phones with Warnings of Approaching Vehicles" and filed by David Shau on Mar. 31, 2017.

BACKGROUND OF THE INVENTION

The present invention relates to mobile phones that provide warnings of approaching vehicles for pedestrians using structures or methods that require minimal computing power.

A mobile phone is a portable telephone that can make and receive calls over a radio frequency link while the user is moving within a telephone service area. In addition to telephone functions, mobile phones also possess multiple other functions. For example, a mobile phone can be used to text, browse the internet, play video games, take pictures, record videos, play music, and set alarms. Ever since the rise of smartphone technology, it has been a commonality to see individuals using their mobile phones at almost any location. However, this usage often distracts the user from outside stimuli, and can be dangerous in areas with fast moving vehicles. According the studies performed by Ohio State University, the percentage of pedestrians killed while using cell phones has risen by 2.5% from 2004 to 2010. Although nearly everyone has been warned about the dangers of texting while driving, using mobile phones while walking is still an underrated issue, and a less scrutinized safety hazard.

It is therefore desirable to have a method in which pedestrians can be warned of approaching vehicles while they are using a mobile phone. Such warnings should be given by the mobile phone while it is in use, and should clearly indicate the general location or direction of the incoming vehicle. Because these methods are to be executed in real-time by mobile phones that are supporting other functions in parallel, the algorithms can only use a fraction of the computing power of a typical mobile phone. The algorithms also must consume minimal power in order to keep the battery of the mobile phone alive for a sufficient amount of time. For example, it would be insufficient if the battery life of the mobile phone depletes after one hour of usage of such methods. Therefore, methods developed for larger and more powerful hardware are not applicable. Examples include methods used by Google and Uber's autonomous vehicles, which rely on a combination of advanced cameras, lasers, and radar systems to function and detect nearby vehicles. In addition, the hardware that composes mobile phones are not specifically designed to identify approaching vehicles, in contrast to Apple's Always on Processor (AOP), which specifically functions to perform the voice recognition that powers up Siri. This further stresses the importance of needing an algorithm that is efficient and requires minimal battery power. Overall, these methods of warning pedestrians of incoming vehicles while they are using a mobile phone serves to make pedestrians more aware of their surroundings, thereby decreasing the chance for pedestrian-vehicle accidents to occur.

This application is a continuation-in-part application of previous patent application with a Ser. No. 15/476,806, and filed by David Shau on Mar. 31, 2017. The previous patent application focuses on mobile devices that provide warnings of dangerous traffic conditions by detecting natural noises emitted by nearby vehicles. This patent application specifies the algorithms used to accomplish the purpose.

SUMMARY OF THE PREFERRED EMBODIMENTS

A primary objective of the preferred embodiments is, therefore, to provide warnings of incoming vehicles for pedestrians while they are using mobile phones. Another objective is to distinguish what kind of vehicle is approaching the pedestrian. Another objective is to differentiate between mild and severe warnings by measuring the speed of the incoming vehicle. Another objective is to provide the relative location and direction of the incoming vehicle, so that the pedestrian will know where to expect danger. Another objective is to estimate the distance of an incoming vehicle from the pedestrian. These and other objectives can be achieved by analyzing the sounds detected by one or a plurality of microphones in a mobile phone device, where the sound analysis requires minimal computing power.

While the novel features of the invention are set forth with particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 2(a, b) show exemplary on-screen displays of the mobile phone in FIG. 1(a);

FIG. 2 (c) is a symbolic block diagram illustrating the structures of the mobile phone in FIGS. 2(a, b);

DETAILED DESCRIPTION OF THE PREFERRED EMBODIMENTS

Figure 1A:
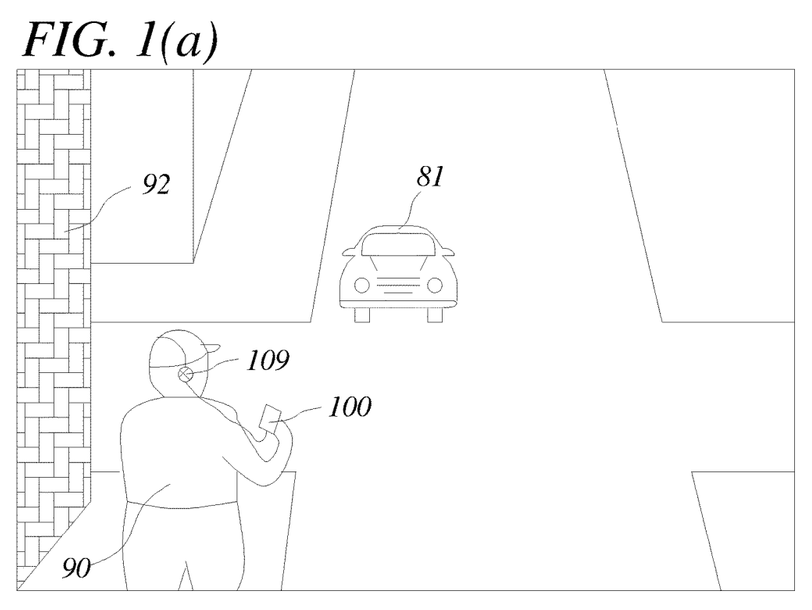
FIG. 1(a) is a symbolic diagram that shows an individual using a mobile phone approaching an intersection.

FIG. 1(a) shows a scenario where an individual (90) is walking towards an intersection while being distracted by his mobile phone (100). He is listening to music with headphones (109), and is playing a video game on his mobile phone (100). While he is aware of the parked car across the street (81), this individual (90) is being distracted by his mobile phone (100), and is unaware of other threats in the vicinity.

Figure 1B:
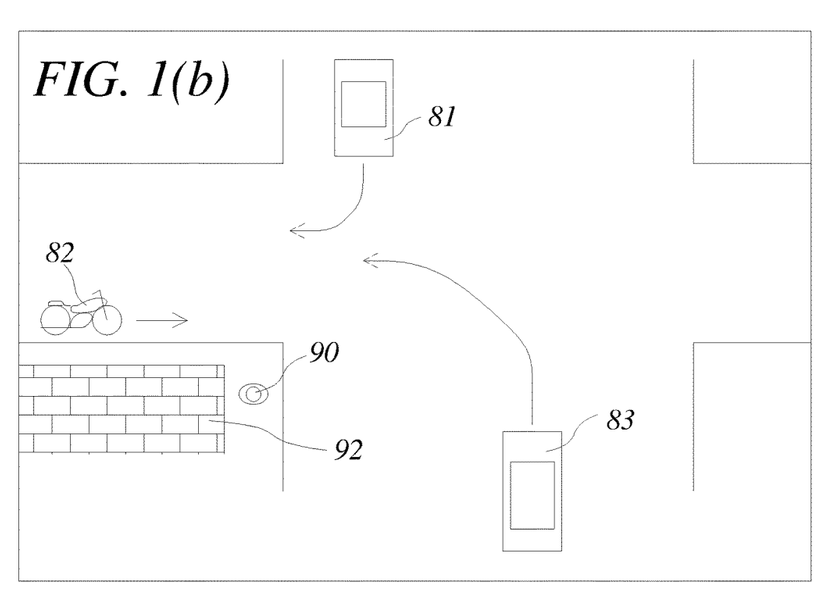
FIG. 1(b) is a simplified symbolic diagram illustrating a bird's-eye-view of the traffic around the individual in FIG. 1(a)

FIG. 1(b) is a simplified symbolic diagram illustrating a bird's-eye-view of the traffic around the individual (90) in FIG. 1(a). A building (92) blocks the view of a speeding motorcycle (82) quickly approaching from the individual's left. Normally, the noise of the approaching motorcycle (82) should be able to alarm the individual (90), but his music (109) and video game prevents him from noticing the sounds of the motorcycle. In addition, a car behind the individual (83) is approaching the intersection with the intent of making a left turn. Furthermore, the owner of the parked car (81) has just turned on the engine, and is planning on turning right, as illustrated by the arrows in FIG. 1(b). Distracted by the video game and music provided by his mobile phone (100), the individual (90) is unaware of the dangers around him, and a collision is bound to occur.

Figure 2A:
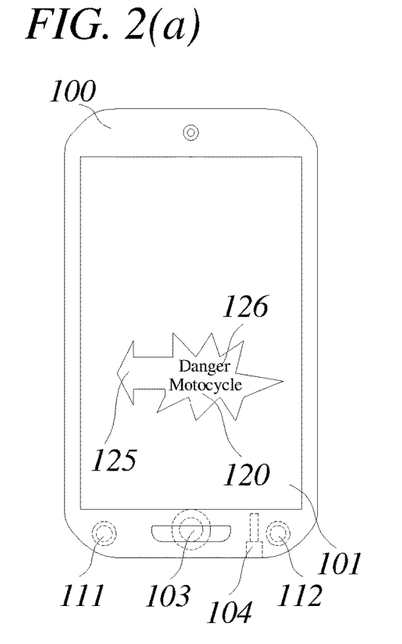

Fortunately, the individual (90) is using an embodiment of the present invention. As illustrated in FIG. 2(a), the microphones (111, 112) in the mobile phone (100) detect sound emitted by the motorcycle (82) in FIG. 1(b). The integrated circuits (200) in the mobile phone (100) provide digital signal processing capabilities to analyze the sound signals and provide an audio warning for the individual (90) through a sound speaker (103) in the mobile phone (100). The audio warning also can be provided to the earphones (109) that are connected to the mobile phone (100) through an audio interface, which can include, but is not limited to, headset sockets or Bluetooth interfaces (104). The audio warning messages temporarily overlap with or overwrite the normal audio that the mobile phone is playing so that the user (90) is alerted. In addition, a warning icon (120) is displayed on the visual display (101) of the mobile phone (100). This warning icon (120) temporarily overlaps or overwrites parts of the normal visual display of the video game that the individual (90) is playing and distinguishes the most dangerous threat. In this case, the threat is the motorcycle approaching on the individual's left; the warning icon (120) indicates the direction of the threat with an arrow (125) and shows the type of vehicle by text (126).

Figure 2B:
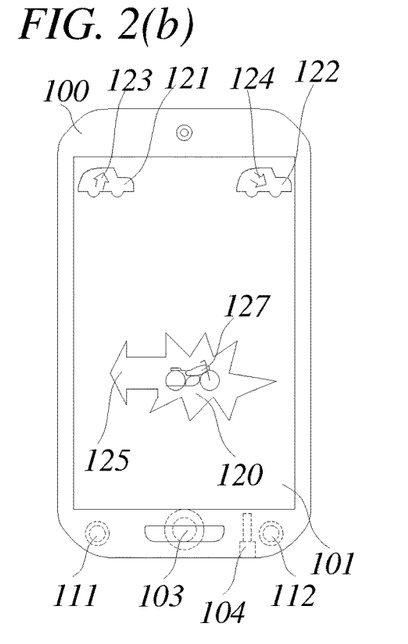

Alternatively, FIG. 2(b) shows another method for displaying warnings. The mobile phone (100) displays a warning icon (120) with an arrow (125) to indicate the direction of the vehicle in similar ways as the example shown in FIG. 2(a), but it displays a graphic symbol (127) of the kind of vehicle that is approaching. In addition, the mobile phone can distinguish sound signals coming from different vehicles, estimate the number of vehicles approaching, and provide warnings of other potential dangers. For the example in FIG. 2(b), the mobile phone (100) displays warning icons (121, 122) that indicate what other kinds vehicles are approaching nearby. These warning icons (121, 122) also indicate the direction of such incoming vehicles with arrows (123, 124). In this case, the warning icons (121, 122) and arrows (123, 124) correspond to the car in front of the individual (81) and the car behind the individual (83).

Figure 2C:
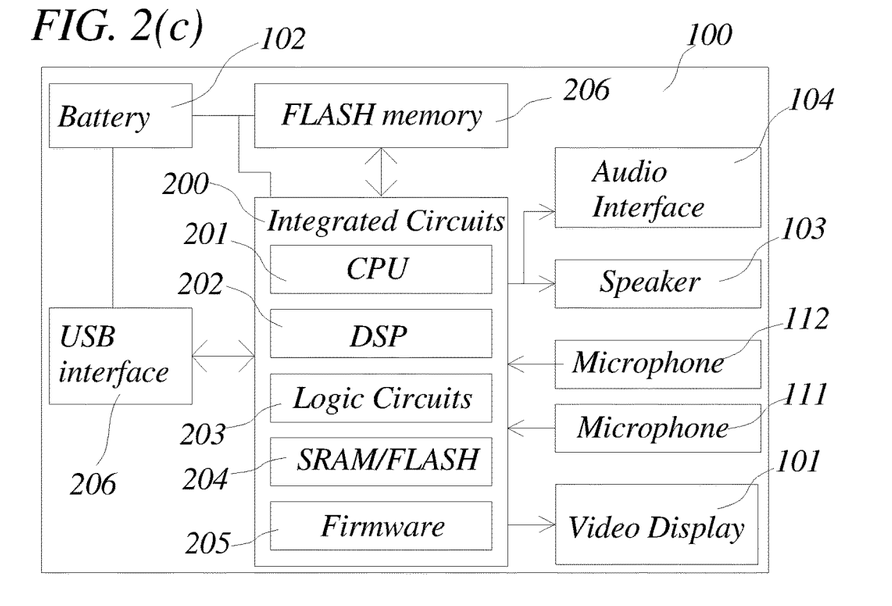

FIG. 2(c) is a symbolic block diagram illustrating the structures of the mobile phone (100) in FIGS. 2(a, b). This mobile phone (100) is controlled by a plurality of integrated circuits (200), which comprise a Central Processing Unit (CPU) (201), a Digital Signal Processing (DSP) unit (202), logic circuits (203), memory devices (204) such as Static Random Access Memory (SRAM) devices and/or nonvolatile memory devices (FLASH), firmware (205), and other integrated circuits. Those functional units (201-205) may be integrated into one integrated circuit chip, or implemented in a plurality of integrated circuit chips. A separate FLASH memory (206) can be used to store more data and more software or firmware. In this example, the mobile phone (100) has two microphones (111, 112), but can also have only one microphone or more than two microphones. Audio outputs can be played using a speaker (103) or earphones connected to the audio interface (104) of the mobile phone (100). Images are displayed on a visual display (101). A battery (102) provides electrical power to those electronic components. The battery (102) can be charged through a Universal Serial Bus (USB) interface (206). The USB interface (206) also provides communication channels with other electronic devices such as computers.

Figure 3A:
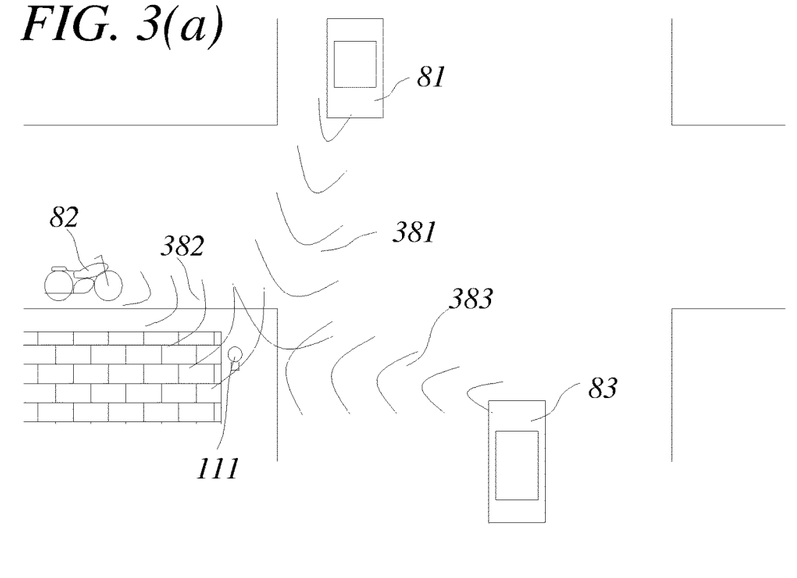
FIG. 3(a) is a simplified symbolic diagram illustrating vehicle noise detection using one microphone.

FIG. 3(a) shows a simplified symbolic view of a microphone (111) in the mobile phone (100) recording the sound waves emitted by the motorcycle (382), the car in front of the individual (381), and the car behind the individual (383). The sound waves that a vehicle emits come from engine noise, emission noise, tire friction, air friction, and other sound sources. Different types of vehicles have different noise patterns. The noise pattern of the sound waves emitted by the motorcycle (382) is different than that of cars. The noise pattern of the sound waves (381) emitted by the car in front (81) is also different than that of the sound waves (383) emitted by the car behind (83). The volume and the spectrum of vehicle sound signals can be used to estimate speed, distance, and direction of the vehicle. Because the hardware, software, and firmware of the mobile phone in FIG. 2(c) can recognize human voices, the same functions can also be used to analyze the vehicle sound signals recorded by the microphone (111).

Figure 3B:
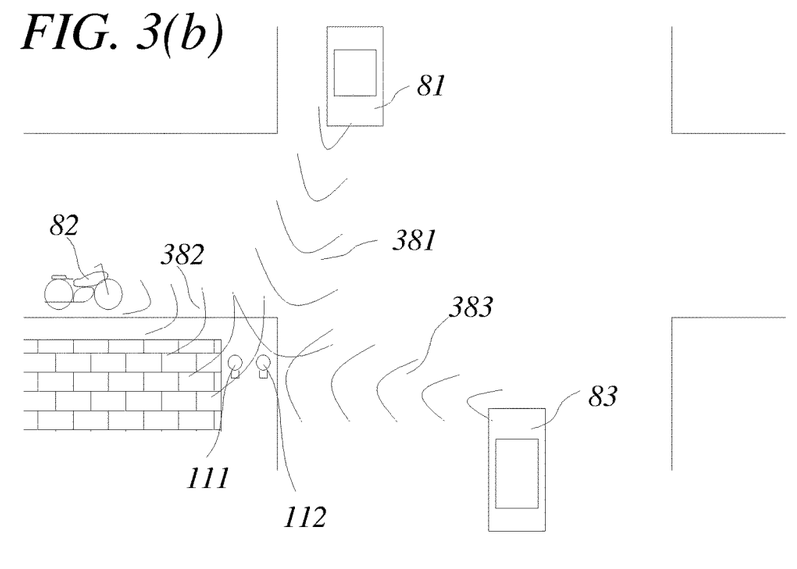
FIG. 3(b) is a simplified symbolic diagram illustrating vehicle noise detection using two microphones.

While the preferred embodiments have been illustrated and described herein, other modifications and changes will be evident to those skilled in the art. It is to be understood that there are many other possible modifications and implementations so that the scope of the invention is not limited by the specific embodiments discussed herein. The example shown in FIG. 3(a) uses sound signals detected by one microphone (111) to analyze traffic conditions. FIG. 3(b) shows an example that uses two microphones (111, 112) in a mobile phone for traffic condition analysis.

Due to the finite speed of sound waves, the sound waves (381-383) emitted by vehicles (81-83) reach the microphones (111, 112) at different times. For example, the sound waves (382) emitted from the motorcycle (82) arrive at the first microphone (111) earlier than they arrive at the second microphone (112); the sound waves (383) emitted from the car behind (83) arrive at the first microphone (111) later than they arrive at the second microphone (112); the sound waves (381) emitted from the car in front (81) arrive at the first microphone (111) slightly later than they arrive at the second microphone (112). By comparing the differences between the sound signals detected by different microphones (111, 112), the mobile phone can estimate the speed, distance, and direction of nearby vehicles, as well as other information relating to the nearby vehicles. Typically, the use of more microphones results in higher accuracies.

While the preferred embodiments have been illustrated and described herein, other modifications and changes will be evident to those skilled in the art. It is to be understood that there are many other possible modifications and implementations so that the scope of the invention is not limited by the specific embodiments discussed herein.

Figure 4:
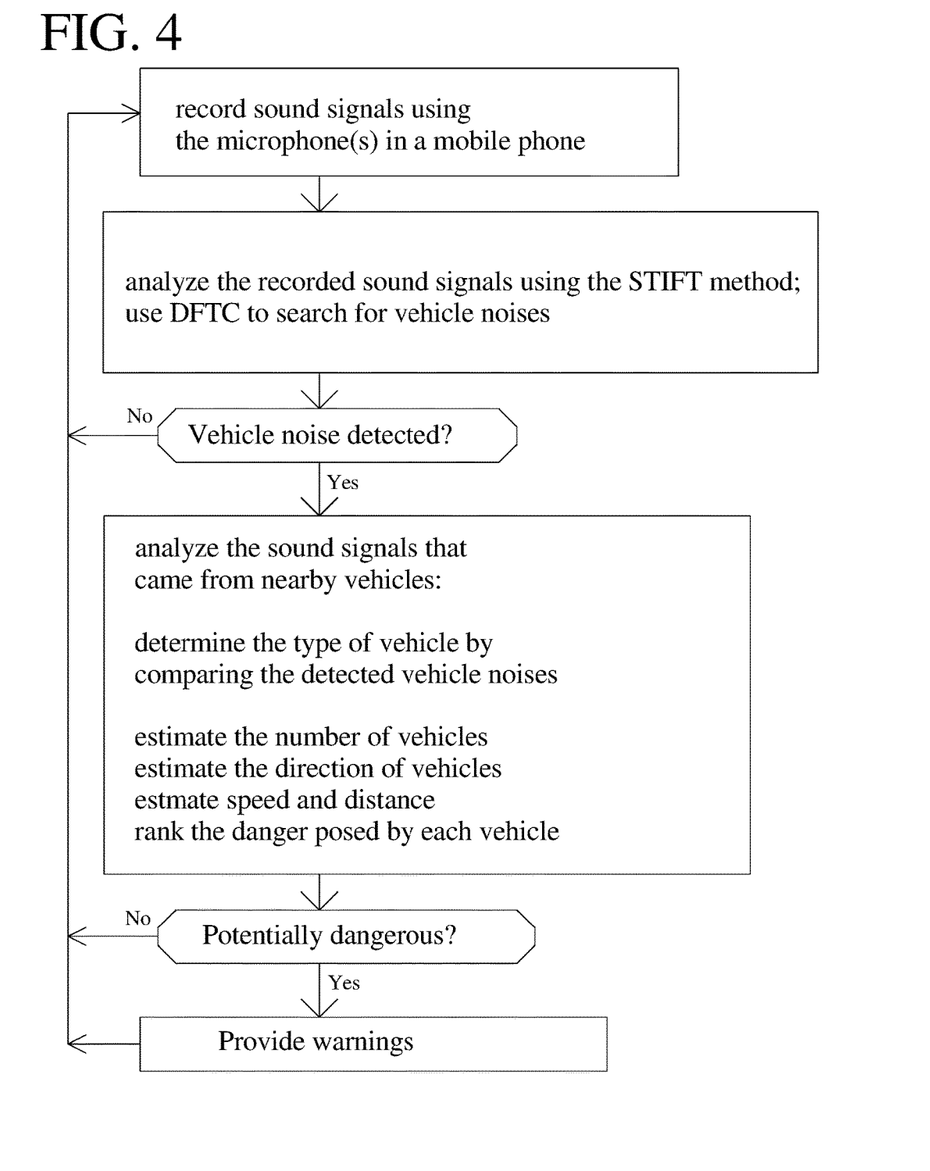
FIG. 4 is a flow chart illustrating exemplary procedures for one embodiment of the present invention.

FIG. 4 is a flow chart illustrating exemplary procedures for one embodiment of the present invention. The sound signals measured by one or more microphones in a mobile phone are recorded by the mobile phone. These recorded sound signals may come from multiple sources such as the voice of the user, noises from nearby buildings, and noises emitted by nearby vehicles. It is necessary to use the signal processing capabilities of the mobile phone to distinguish the vehicle sounds in the recording from all other sounds. Because mobile phones have limited computational capacities relative to computers and large hard drives, most existing sound signal analysis methods are not applicable for this application. Therefore, it is necessary to develop data analysis algorithms specifically for applications of mobile phones.

Such algorithms can involve the use of Fourier Transforms, such as Fast Fourier Transforms (FFTs) or Discrete Fourier Transforms (DFTs). By using one or many of the microphones of a mobile phone to measure incoming sounds, Discrete Fourier Transforms can then be used to generate a sequence of frames, where the recorded sound signals over time are the function to be transformed, and where each of the frames describes the sound over a short amount of time. This process can be abbreviated as the Short Time Interval Fourier Transform method (STIFT), and the time intervals of each frame can be any length equal to or less than one tenth of a second. These frames can contain a sound spectrum that displays amplitude, loudness, or sound intensity with respect to frequency. These frames can also contain the amplitude, loudness, or sound intensity of a singular frequency over a short time interval. These frames can also contain information such as the Discrete Fourier Transform coefficients, or DFTCs, that were calculated given the time interval or window, and frequency domain. The software can then recognize when there is an incoming vehicle by analyzing the changes in amplitude, loudness, or sound intensity of one or multiple frequencies over time. More specifically, the STIFT method comprises the following steps: select one or a plurality of frequencies as the domain, where the number of selected frequencies is determined by the computational capacity and by the battery capacity of the mobile phone, and then determine the Discrete Fourier Transform coefficients (DFTCs) of those selected frequencies, given the recorded sound signals and a predefined time interval, where each time interval is equal to or less than one tenth of a second. The Discrete Fourier Transform coefficients (DFTCs) determined by the STIFT method at adjacent time intervals are then used to analyze the noises emitted by a nearby vehicle or vehicles in order to detect potentially dangerous situations while the user of the mobile phone is using the mobile phone for other mobile phone functions. If vehicle noises are detected, the next step would be to analyze the sound signals emitted by a nearby vehicle or vehicles to detect potentially dangerous situations. Using sound recognition technologies, the mobile phone has the capacity to compare the recorded vehicle sound signals to already known noise patterns of different vehicles to determine the type of each nearby vehicle. The mobile phone is therefore able to distinguish the sound signals coming from different vehicles in order to estimate the number of nearby vehicles. After the sounds signals of each vehicle are distinguished, the mobile phone can then analyze the sound signals of each individual vehicle separately. If there is only one microphone, the speed, distance, and the direction of a vehicle can be estimated by analyzing the volume and the spectrum of sound signals coming from the vehicle. If there are two or more microphones, geometry induced timing differences of the arrival of the vehicle sound waves can provide additional information to estimate the approach speed, distance, and the direction of a vehicle with better accuracy. By knowing the type, speed, distance, and direction of each nearby vehicle, the mobile phone can rank the level of potential danger that each vehicle poses, and can provide warnings for the user. The warning messages can be delivered through user interfaces of the mobile phone such as audio messages and/or images, as illustrated by the examples in FIGS. 2(*a*, *b*).

Figure 5:
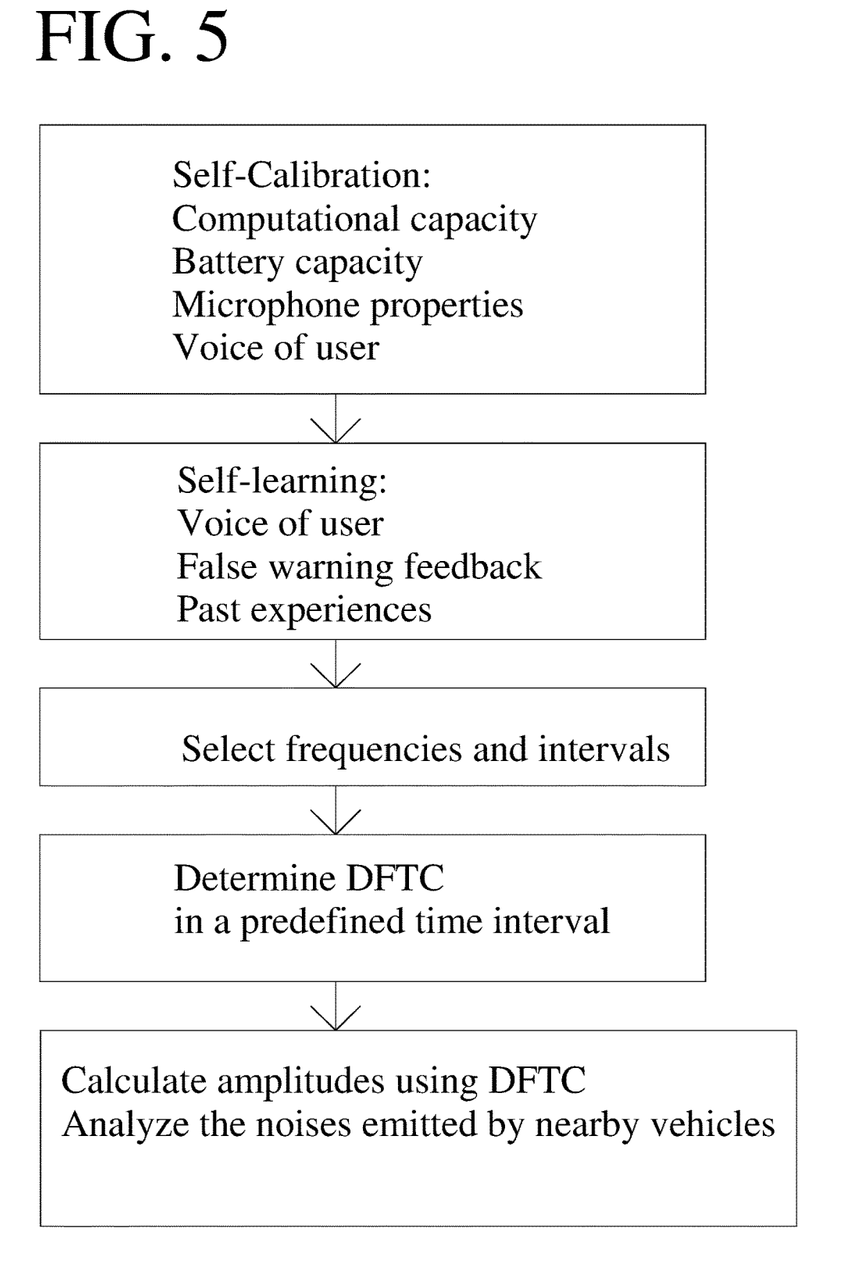
FIG. 5 is a flow chart illustrating exemplary procedures for one embodiment of the method used to determine parameters for the Short Time Interval Fourier Transform (STIFT) method.

FIG. 5 is a flow chart illustrating exemplary procedures for one embodiment of the method that determines parameters for the Short Time Interval Fourier Transform (STIFT) method. Current art mobile phones do not have enough computational capacities to support Fourier Transform analyses that calculate wide frequency spectrums. Attempting to do so would decrease the battery life of the mobile phone at a high and undesirable rate. It is therefore necessary to apply self-calibration or self-learning algorithms to optimize parameters used in STIFT method. For example, if too many frequencies are selected in the domain, the mobile phone may consume battery power at a high and undesirable rate. In contrast, selecting too few frequencies can introduce multiple false alarms, or reduce the quality and accuracy of the sound analysis. It is therefore desirable to calibrate the computational capacity and battery capacity of a mobile phone to determine optimal parameters used for STIFT analysis. Furthermore, because mobile phone microphones are not standardized, different phones will pick up different ranges of sound frequencies, and some mobile phone microphones will be more sensitive towards certain frequencies than other mobile phone microphones. Therefore, the algorithm can comprise a self-calibration step in which pre-determined frequencies are played using the speaker of the mobile phone at a pre-determined amplitude, loudness, or sound intensity. The amplitude, loudness, or sound intensity of the frequencies that the microphone picks up can then be compared to that of the pre-determined values; this allows the algorithm to analyze the properties of the microphone of the mobile phone, which will allow the algorithm to account for the different types of microphones in different phones.

In addition, the algorithm can comprise self-learning characteristics. For example, the algorithm can have a feedback system: when the mobile phone provides a false warning to the user of an incoming vehicle, the algorithm can provide an option for the user to inform the algorithm that there was a false warning. This user feedback can then be used to modify the existing algorithm. By using self-learning algorithms, other significant events in past experiences can also provide inputs to optimize the parameters used in the sound analysis. Furthermore, while recording sound signals for traffic analysis, the user of the mobile phone may be using said microphones for other mobile phone functions. For example, the user may be in a phone call. It is therefore desirable to select frequencies that are out of the range of the human voice spectrum in order to avoid interference. Overall, self-calibration or self-learning methods can be used to minimize the interferences of user voices.

While specific embodiments of the invention have been illustrated and described herein, it is realized that other modifications and changes will occur to those skilled in the art. It is therefore to be understood that the appended claims are intended to cover all modifications and changes as fall within the true spirit and scope of the invention.

What is claimed is:

1. A method for providing warnings of approaching vehicles for mobile phone users that comprises the following steps:
   record sound signals measured by one or a plurality of microphones in a mobile phone while the user of the mobile phone may be using said microphones for other mobile phone functions,
   use the signal processing capabilities of the mobile phone to analyze the recorded sound signals in real-time using the Short Time Interval Fourier Transform (STIFT) method, wherein the STIFT method comprises the following steps:
      select one or a plurality of frequencies as the domain, where the number of selected frequencies is determined by the computational capacity and by the battery capacity of the mobile phone, and determine the Discrete Fourier Transform Coefficients of those selected frequencies, given the recorded sound signals and a predefined time interval, where each time interval is equal to or less than one tenth of a second;

use the Discrete Fourier Transform Coefficients determined by STIFT method at adjacent time intervals to analyze the noises emitted by a nearby vehicle or vehicles in order to detect potentially dangerous situations while the user of the mobile phone is using the mobile phone for other mobile phone functions, and provide real-time warning messages for potentially dangerous situations using the user interfaces of the mobile phone.

2. The method in claim 1 wherein the step of recording sound signals comprises the step of recording sound signals measured by two or more microphones in a mobile phone.

3. The Short Time Interval Fourier Transform (STIFT) method in claim 1 further comprises a step of adjusting the number of selected frequencies according to the computational capacity and battery capacity of the mobile phone.

4. The method in claim 1 wherein the step of using the Discrete Fourier Transform coefficients determined by STIFT method at adjacent time intervals to analyze the noises emitted by a nearby vehicle or vehicles comprises a step of using the Discrete Fourier Transform coefficients to calculate the amplitudes of the noises at selected frequencies.

5. The method in claim 1 further comprises a step of self-calibration of the microphone or microphones of the mobile phone in order to optimize the accuracy of the method.

6. The method in claim 1 further comprises a step of filtering out the voice of the mobile phone user.

7. The method in claim 1 further comprises a step of providing an option for the user to inform instances of false warnings.

8. The method in claim 1 further comprises a step of providing self-learning properties that optimize the method based on past experiences.

9. The Short Time Interval Fourier Transform (STIFT) method in claim 1 further comprises a step of adjusting the length of the time interval based off of self-calibration outputs and results.

10. The Short Time Interval Fourier Transform (STIFT) method in claim 1 further comprises a step of adjusting the length of the time interval based off of self-learning outputs results.

11. The method in claim 1 wherein the step of using the mobile phone to analyze the sound signals emitted by a nearby vehicle or vehicles comprises a step of estimating the approaching speed of each nearby vehicle.

12. The method in claim 1 wherein the step of using the mobile phone to analyze the sound signals emitted by a nearby vehicle or vehicles comprises a step of estimating the distance of each nearby vehicle from the user.

13. The method in claim 1 wherein the step of using the mobile phone to analyze the sound signals emitted by a nearby vehicle or vehicles comprises a step of ranking the level of danger that each nearby vehicle poses.

14. The method in claim 1 wherein the step of providing warning messages comprises a step of providing audio warning messages that overlap with or overwrite the current audio that the mobile phone is emitting.

15. The method in claim 1 wherein the step of providing warning messages comprises a step of providing visual warning messages that overlap with or overwrite part of the current visual display of the mobile phone.

16. The method in claim 1 wherein the step of providing warning messages comprises a step of providing audio warning messages using the sound speaker in the mobile phone.

17. The method in claim 1 wherein the step of providing warning messages comprises a step of providing audio warning messages through headphones, earbuds, or earphones that are connected to the audio interface of the mobile phone.

18. The method in claim 1 wherein the step of providing warning images comprises a step of providing a graphic symbol of the vehicle on the visual display of the mobile phone.

* * * * *